United States Patent
Hu

(12) 
(10) Patent No.: US 11,080,503 B2
(45) Date of Patent: Aug. 3, 2021

(54) METHOD AND APPARATUS FOR IDENTIFYING FINGERPRINT, ELECTRONIC DEVICE, AND COMPUTER READABLE STORAGE MEDIUM

(71) Applicant: BEIJING XIAOMI MOBILE SOFTWARE CO., LTD., Beijing (CN)

(72) Inventor: Xiankun Hu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 40 days.

(21) Appl. No.: 16/699,468

(22) Filed: Nov. 29, 2019

(65) Prior Publication Data

US 2020/0242317 A1 Jul. 30, 2020

(30) Foreign Application Priority Data

Jan. 25, 2019 (CN) .......................... 201910074990.6

(51) Int. Cl.
*G06K 9/00* (2006.01)
*G06K 9/20* (2006.01)
*G06F 3/044* (2006.01)

(52) U.S. Cl.
CPC ........... *G06K 9/0002* (2013.01); *G06F 3/044* (2013.01); *G06K 9/0004* (2013.01); *G06K 9/00067* (2013.01); *G06K 9/00087* (2013.01); *G06K 9/2027* (2013.01); *G06K 9/2081* (2013.01)

(58) Field of Classification Search
CPC ........ G06K 9/00006–0012; G06K 2009/0006; G06F 3/041–047
See application file for complete search history.

(56) References Cited

U.S. PATENT DOCUMENTS

| 9,734,379 B2* | 8/2017 | Tuneld | G06K 9/00026 |
|---|---|---|---|
| 9,767,338 B2* | 9/2017 | Yoon | G06K 9/0002 |
| 10,725,578 B2* | 7/2020 | Lee | G06K 9/22 |
| 2012/0076370 A1* | 3/2012 | Lei | G06K 9/00026 |
| | | | 382/125 |
| 2015/0135108 A1 | 5/2015 | Pope et al. | |
| 2015/0139511 A1* | 5/2015 | Yoon | G06K 9/0002 |
| | | | 382/124 |
| 2016/0063298 A1* | 3/2016 | Tuneld | G06K 9/00026 |
| | | | 348/77 |

(Continued)

FOREIGN PATENT DOCUMENTS

| CN | 107194331 A | 9/2017 |
|---|---|---|
| CN | 107704744 A | 2/2018 |

(Continued)

OTHER PUBLICATIONS

Extended European Search Report issued in EP Application No. 19213338.7 dated Jun. 8, 2020, (9p).

(Continued)

*Primary Examiner* — Patrick F Marinelli
(74) *Attorney, Agent, or Firm* — Arch & Lake LLP

(57) ABSTRACT

A method for identifying a fingerprint being applied to a terminal is provided. The method may include: obtaining contact region parameters related to a contact region on the terminal; determining a contact pattern according to the contact region parameters; collecting and/or identifying fingerprint information within the contact pattern.

19 Claims, 11 Drawing Sheets

(56) References Cited

U.S. PATENT DOCUMENTS

| | | | | |
|---|---|---|---|---|
| 2016/0171281 A1* | 6/2016 | Park | ................ | G06K 9/00087 |
| | | | | 382/124 |
| 2018/0224999 A1* | 8/2018 | Lee | ................ | G06F 3/0488 |
| 2018/0253614 A1* | 9/2018 | Lee | ................ | G06K 9/0002 |
| 2019/0340414 A1* | 11/2019 | Vaezi Joze | ........ | G06K 9/00006 |
| 2020/0184171 A1* | 6/2020 | Lee | ................ | G06K 9/6202 |
| 2020/0234027 A1* | 7/2020 | Han | ................ | H04L 63/0861 |
| 2020/0242317 A1* | 7/2020 | Hu | ................ | G06K 9/00067 |
| 2020/0242326 A1* | 7/2020 | Lee | ................ | G06F 21/32 |
| 2020/0242328 A1* | 7/2020 | Chung | .............. | G06F 1/1626 |
| 2020/0293746 A1* | 9/2020 | Hu | ................ | G06F 21/32 |

FOREIGN PATENT DOCUMENTS

| | | | |
|---|---|---|---|
| EP | 3032385 | A1 | 6/2016 |
| EP | 3153989 | A1 | 4/2017 |
| EP | 3358455 | A1 | 8/2018 |
| EP | 3396515 | A1 | 10/2018 |
| WO | 2013173838 | A2 | 11/2013 |

OTHER PUBLICATIONS

Extended European Search Report issued in EP Application No. 19216905.0 dated Jul. 17, 2020, (11p).
Non-Final Office Action issued in U.S. Appl. No. 16/699,504 dated Jan. 25, 2021, (11p).
Final Office Action issued in U.S. Appl. No. 16/699,504 dated Apr. 28, 2021, (10p).

* cited by examiner

METHOD AND APPARATUS FOR IDENTIFYING FINGERPRINT, ELECTRONIC DEVICE, AND COMPUTER READABLE STORAGE MEDIUM

CROSS REFERENCE TO RELATED APPLICATION

This application claims priority to Chinese Patent Application No. 201910074990.6 filed on Jan. 25, 2019, the entire content of which is incorporated herein by reference for all purposes.

FIELD

The present disclosure relates to the field of touch technology, and in particular to methods and apparatuses for identifying a fingerprint, an electronic device and a computer readable storage medium.

BACKGROUND

With the development of fingerprint identification technology, under-screen fingerprint identification may be realized in a terminal at present. That is, fingerprint identification may be performed by using fingerprint identification sensors disposed in a display region of the terminal.

SUMMARY

The present disclosure provides a method for identifying a fingerprint, an electronic device and a computer readable storage medium.

According to a first aspect of the present disclosure, a method of identifying a fingerprint is provided, which is applied to a terminal, the method including: obtaining contact region parameters related to a contact region on the terminal; determining a contact pattern according to the contact region parameters; and collecting and/or identifying fingerprint information within the contact pattern.

According to a second aspect of the present disclosure, there is provided an electronic device, including: one or more processors; and a memory storing processor-executable instructions, where, upon execution of the instructions, the one or more processors are configured to obtain contact region parameters; determine a contact pattern according to the contact region parameters; and collect and/or identify fingerprint information within the contact pattern.

According to a third aspect of the present disclosure, a non-transitory computer readable storage medium storing instructions therein, where, when the instructions are executed by a processor, the instructions cause the processor to obtain contact region parameters; determine a contact pattern according to the contact region parameters; and collect and/or identify fingerprint information within the contact pattern.

It is understood that the above general descriptions and subsequent detailed descriptions are merely illustrative and explanatory and shall not be intended to limit the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1:
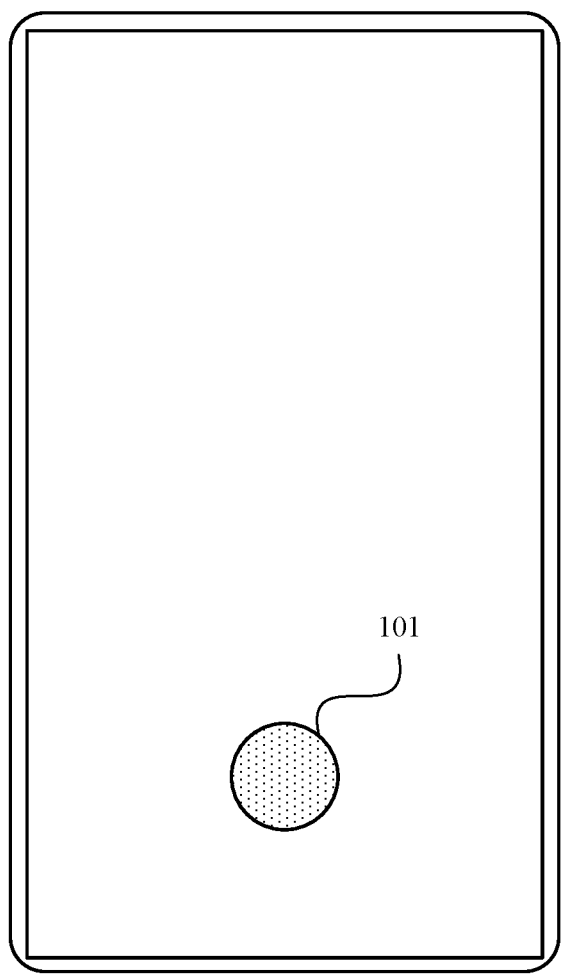
FIG. 1 is a schematic diagram illustrating a fingerprint identification region.

Examples will be described in detail herein with the illustrations thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure.

The terms used in the present disclosure are for the purpose of describing a particular example only, and are not intended to limit the present disclosure. The singular forms such as "a," 'said," and "the" used in the present disclosure and the appended claims are also intended to include multiple, unless the context clearly indicates otherwise. It is also to be understood that the term "and/or" as used herein refers to any or all possible combinations that include one or more associated listed items. Depending on the context, the word "if" as used herein may be interpreted as "when" or "as" or "in response to determining."

The manner of performing fingerprint identification by disposing the fingerprint identification sensors is significantly limited. Further, for determining a contact region on a terminal, a gravity center of the contact region is determined. At present, the gravity center is determined by performing weighted averaging for touch signals. However, because a user may apply a different force at each position of a finger when touching a terminal, the gravity center determined in this way may not coincide with a center (centroid) of the contact region. When the gravity center is located in a fingerprint identification region, a circular region is determined with the gravity center as a center of the circular region with a fixed radius, and all fingerprint identification sensors within the circular region are enabled to identify a fingerprint. However, because the gravity center may not coincide with the center of the contact region, and a contact region in the circular region may be only a small portion of the contact region between the user and the terminal, thereby resulting in incomplete fingerprint information being collected.

Figure 2:
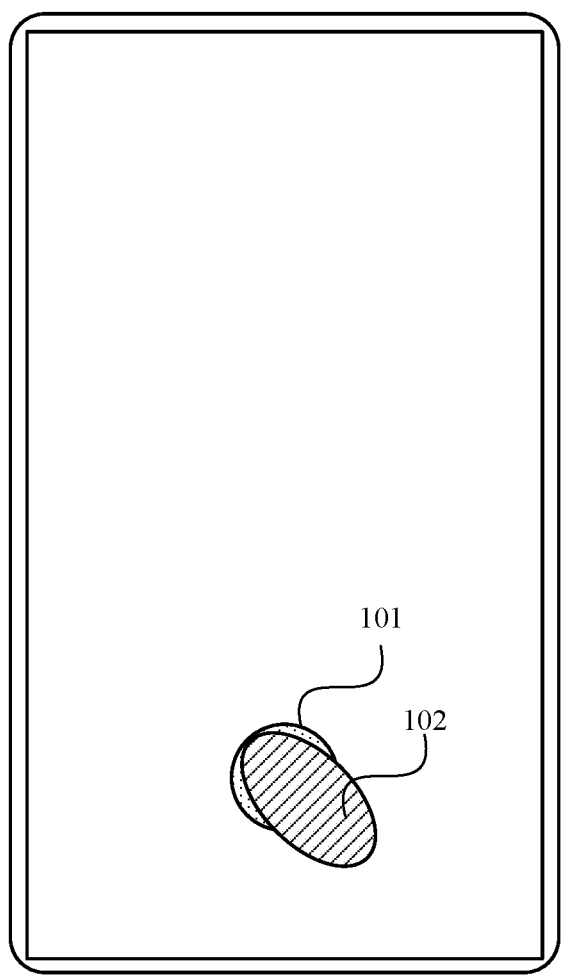
FIG. 2 is a schematic diagram illustrating a relationship of a contact region and a fingerprint identification region.

As shown in FIG. 1, when a gravity center of a contact region is located in a fingerprint identification region, a circular region 101 is determined with the gravity center as a center of the circular region with a fixed radius. Here, the contact region refers to a region on the terminal, which is in direct contact with a user fingerprint. A shape of the contact region is usually not circular when a user performs a fingerprint identification operation. For example, as shown in FIG. 2, the shape of the contact region 102 which is between a finger of the user and a terminal is elliptical. Thus, the contact region may not cover the circular region in the fingerprint identification region, so that a gap exists between the contact region and the circular region. When all fingerprint identification sensors, for example, photoelectric sensors, in the circular region are enabled, since the photoelectric sensors at the gap are not blocked by the finger, light leakage will be observed by the user in the case shown in FIG. 2, thereby affecting the use experiences. Further, the collected fingerprint information may not even reach a half of the contact region, resulting in incomplete fingerprint information being collected.

Figure 3:
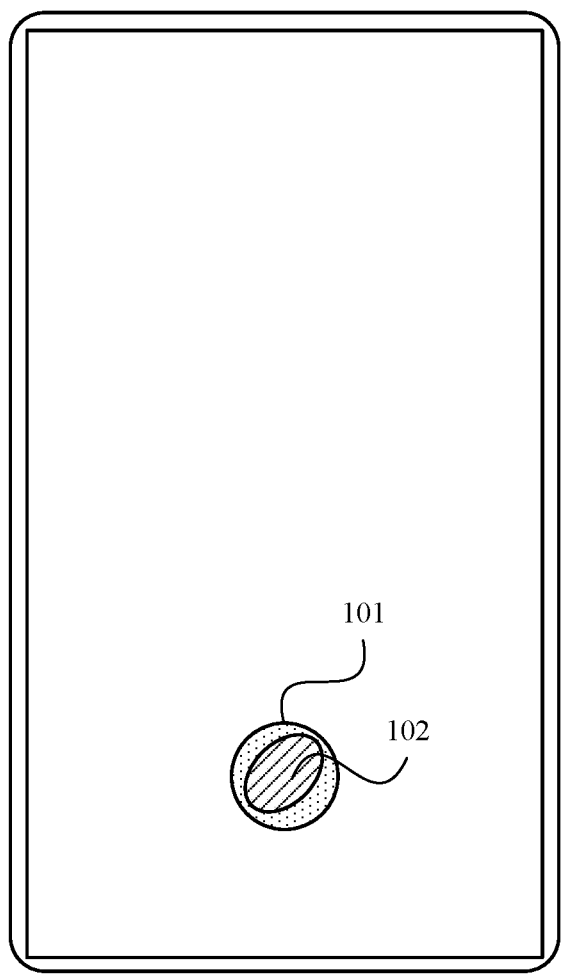
FIG. 3 is a schematic diagram illustrating another relationship of a contact region and a fingerprint identification region.

In another example, even though the contact region 102 is completely within the circular region 101, as shown in FIG. 3, the user may only touch the fingerprint identification region with a part of the finger, for example, a fingertip. Due to the fixed radius of the circular region 101, in this case, there still exists the problem of light leakage as shown in FIG. 2. Further, fingerprint information collected is little, which is not helpful to fingerprint identification.

Figure 4:
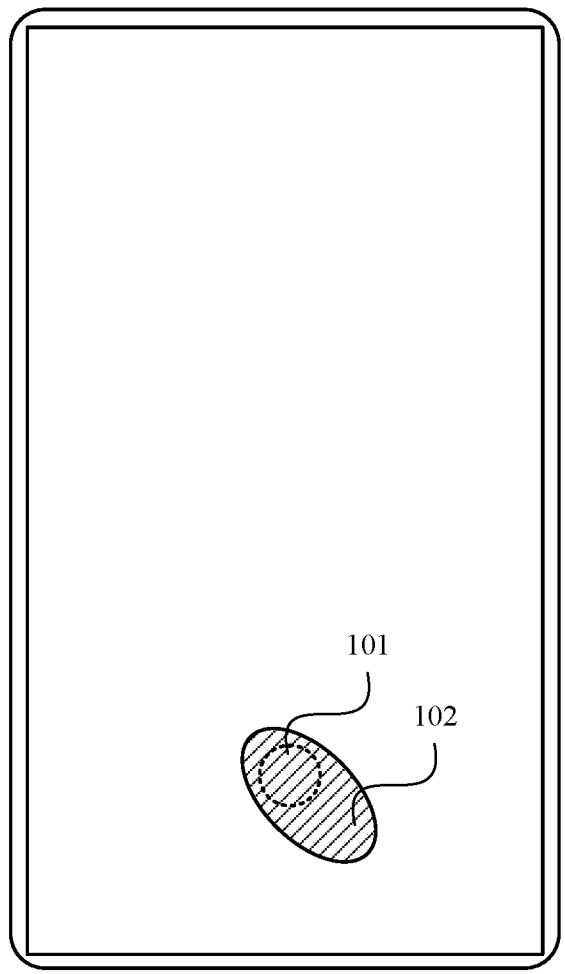
FIG. 4 is a schematic diagram illustrating another relationship of a contact region and a fingerprint identification region.

If the circular region is reduced to avoid the problem of light leakage, as shown in FIG. 4, since the circular region 101 (a region indicated by a dotted line) located in the contact region is a small area, the fingerprint information collected is less, which affecting fingerprint identification.

Figure 5:
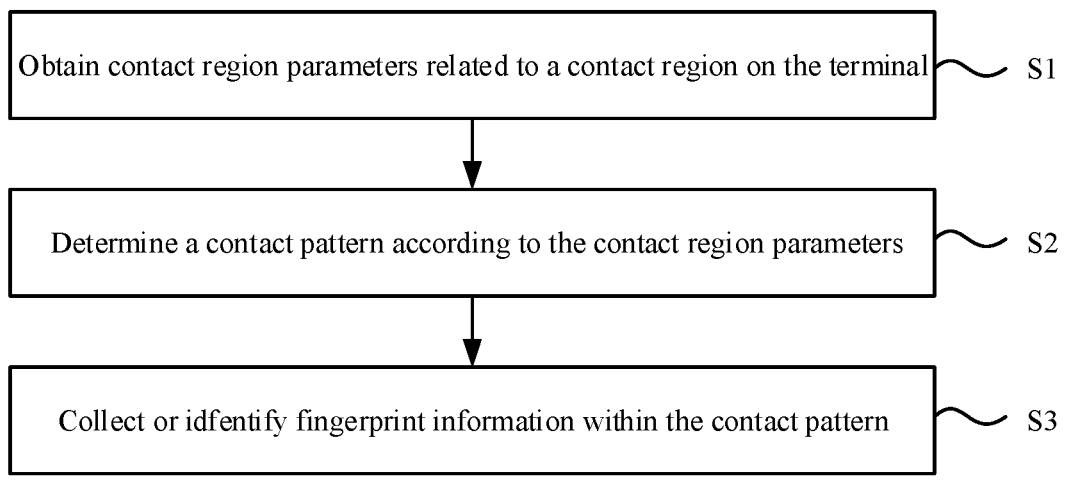
FIG. 5 is a flowchart illustrating a method of identifying a fingerprint according to an example of the present disclosure.

FIG. 5 is a flowchart illustrating a method of identifying a fingerprint according to an example of the present disclosure. The method of identifying a fingerprint according to the present disclosure may be applied to a terminal, such as a mobile phone, a tablet computer, and a wearable device. The terminal includes a touching module and a fingerprint identifying module. The touching module may include a plurality of touch sensors and a touch processor, and the fingerprint identifying module may include a plurality of fingerprint identification sensors and a fingerprint identification processor. The touch sensors include but not limited to mutual-inductance capacitive sensors and/or self-inductive capacitive sensors, which may be selected according to needs. The fingerprint identification sensors include but not limited to photoelectric sensors and/or ultrasonic sensors, which may be selected according to needs.

In an example, the terminal may further include a display panel having the touch sensors and the fingerprint identification sensors therein.

It is noted that a fingerprint identification region where the fingerprint identification sensors are disposed in the examples of the present disclosure may be far larger than a fingerprint identification region in the related art. As shown in FIG. 1, the fingerprint identification region in the related art is a small region at a lower half portion of the display panel. In the examples of the present disclosure, the fingerprint identification region may be disposed in a half region of the display panel, even in the entire display panel.

As shown in FIG. 5, the method of identifying a fingerprint may include the following steps S1-S3.

At step S1, the terminal obtains contact region parameters related to a contact region on the terminal. The contact region parameters may include line parameters and angle parameters based on contact points in the contact region.

At step S2, a contact pattern is determined according to the contact region parameters. For example, the contact pattern may include one or more geometrical shapes including: ellipses, squares, circles, rectangles, etc.

At step S3, fingerprint information within the contact pattern is collected or identified. The terminal may activate sensors within the contact pattern and only collect fingerprint information using the activated sensors. Alternatively, the terminal may apply a weight matrix so that only fingerprint information within the contact pattern is considered for subsequent operations to identify the fingerprint.

In an example, fingerprint identification sensors within the contact pattern may be controlled to collect and/or identify the fingerprint information within the contact pattern which is determined according to the contact region parameters.

On one hand, since the fingerprint identification sensors performing fingerprint identification are merely fingerprint identification sensors within the contact pattern and the contact pattern is covered by a finger of a user, even though the fingerprint identification sensors are photoelectric sensors, light emitted by the photoelectric sensors can be blocked by the finger of the user without any light leakage, thereby improving the user experiences.

On the other hand, since all fingerprint identification sensors in the contact region are controlled to perform fingerprint identification, fingerprint patterns on the contact pattern may be identified, or, the entire contact pattern may be identified. Thus, more fingerprint information is collected, and subsequent operations, such as fingerprint identification, fingerprint authentication, and the like, may be performed easily.

Figure 6:
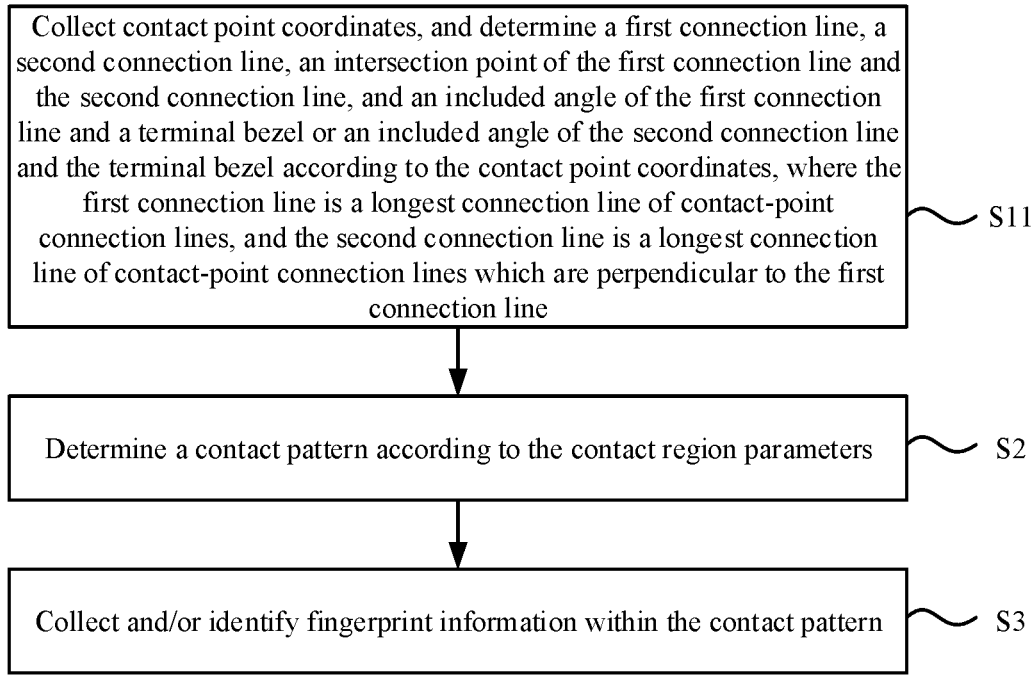
FIG. 6 is a flowchart illustrating another method of identifying a fingerprint according to an example of the present disclosure.

FIG. 6 is a flowchart illustrating another method of identifying a fingerprint according to an example of the present disclosure. As shown in FIG. 6, obtaining the contact region parameters includes the following step S11.

At step S11, contact point coordinates are collected, a first connection line, a second connection line, an intersection point of the first connection line and the second connection line, and an included angle of the first connection line and a terminal bezel or an included angle of the second connection line and the terminal bezel are determined according to the contact point coordinates, where the first connection line is a longest connection line of contact-point connection lines, and the second connection line is a longest connection line of contact-point connection lines which are perpendicular to the first connection line.

The touching module includes touch sensors. When the finger touches the display panel, one or more contact point coordinates are collected by each touching sensor. These contact points may be connected in pairs to obtain multiple connection lines. The length of each connection line may be calculated separately, and the longest connection line is determined as the first connection line. Then the longest connection line among the connection lines which are perpendicular to the first connection line is determined as the second connection line.

Figure 7:
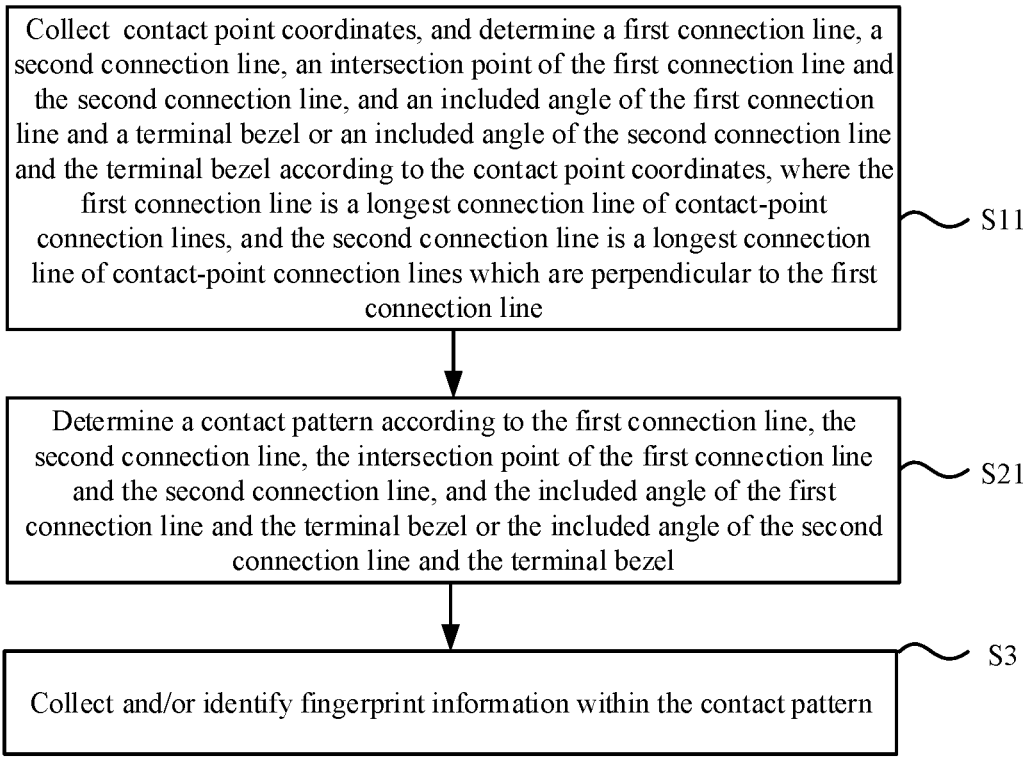
FIG. 7 is a flowchart illustrating another method of identifying a fingerprint according to an example of the present disclosure.

FIG. 7 is a flowchart illustrating another method of identifying a fingerprint according to an example of the present disclosure. As shown in FIG. 7, determining the contact pattern according to the contact region parameters includes the following step S21.

At step S21, the contact pattern is determined according to the first connection line, the second connection line, the intersection point of the first connection line and the second connection line and the included angle of the first connection line and the terminal bezel or the included angle of the second connection line and the terminal bezel.

Figure 8:
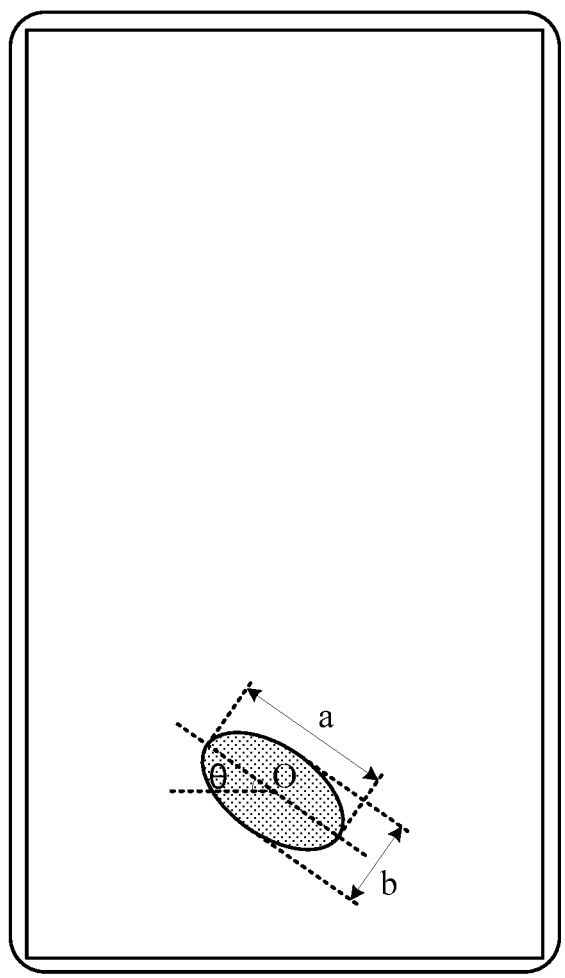
FIG. 8 is a schematic diagram of obtaining contact region parameters according to an example of the present disclosure.

FIG. 8 is a schematic diagram of obtaining contact region parameters according to an example of the present disclosure.

In an example, as shown in FIG. 8, since the contact pattern on a terminal is generally close to an ellipse when a user performs fingerprint identification, a major axis a of the ellipse may be determined according to the first connection line and a minor axis b of the ellipse may be determined according to the second connection line. For the ellipse, a shape of the ellipse may be determined after the major axis and the minor axis are determined.

Further, the intersection point O of the first connection line and the second connection line is determined, that is, a center of the ellipse, i.e., the center of the contact pattern, is determined. In this way, the position of the contact pattern in the display region of the terminal is determined. An inclination angle of the contact pattern relative to the terminal bezel may be determined according to the included angle of the first connection line and the terminal bezel or according to the included angle of the second connection line and the terminal bezel. As shown in FIG. 8, an included angle θ of the first connection line and a bottom bezel of the terminal is taken as an example. Of course, an included angle of the first connection line and another bezel of the terminal or an included angle of the second connection line and the bezel of the terminal may also be calculated according to needs.

As a result, the contact pattern may be determined roughly by determining the shape and the position of the contact pattern, and the included angle of the contact pattern relative to the terminal bezel, according to the first connection line, the second connection line, the intersection point and the included angle.

Figure 9:
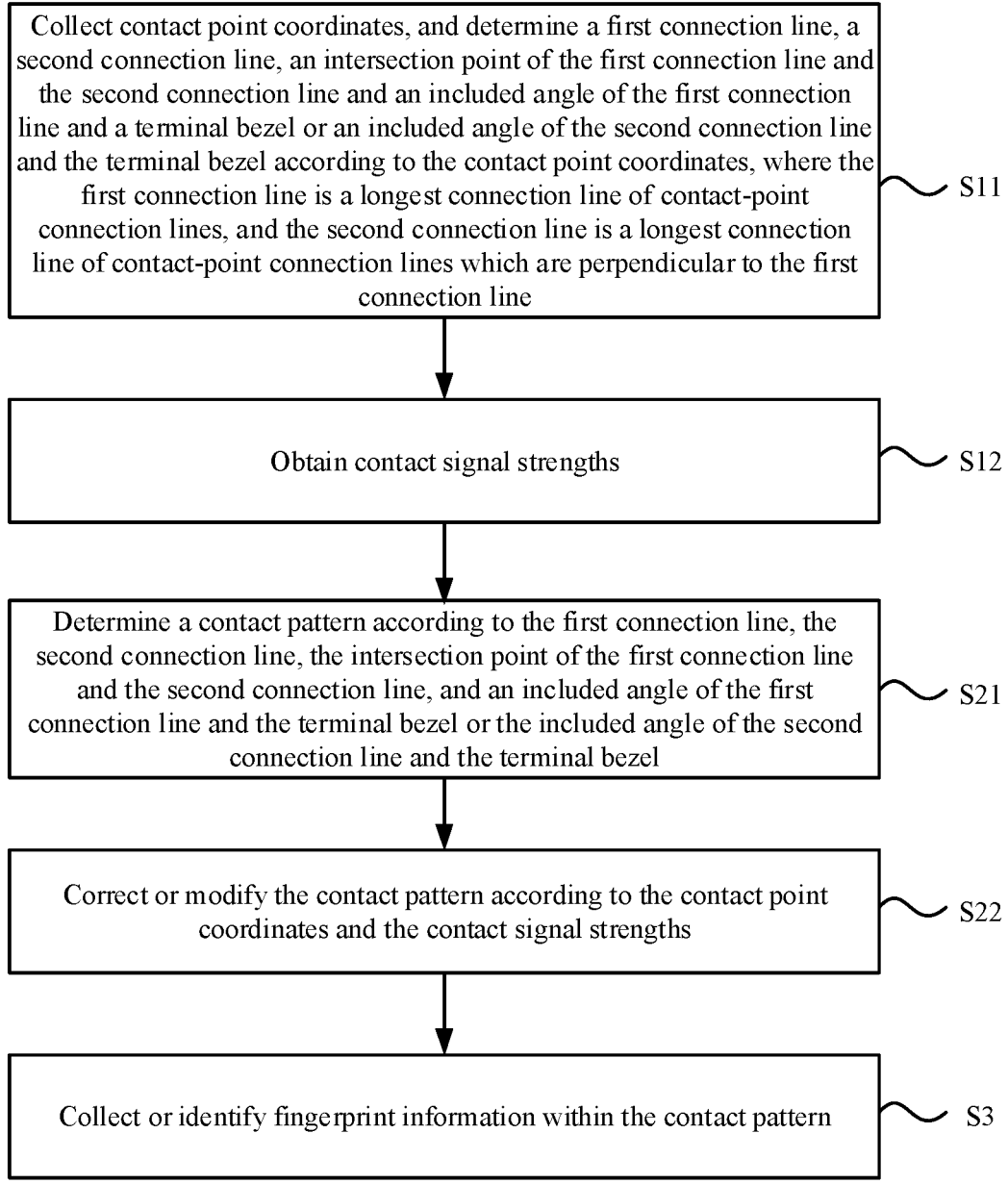
FIG. 9 is a flowchart illustrating another method of identifying a fingerprint according to an example of the present disclosure.

FIG. 9 is a flowchart illustrating another method of identifying a fingerprint according to an example of the present disclosure. As shown in FIG. 9, obtaining the contact region parameters further includes the following step S12.

At step S12, contact signal strengths are obtained.

Determining the contact pattern according to the contact region parameters further includes the following step S22.

At step S22, the contact pattern is corrected or modified according to the contact point coordinates and the contact signal strengths.

In an example, the contact signal strength may be further considered on the basis of determining the contact pattern according to the first connection line, the second connection line, the intersection point and the included angle. The shape of the contact pattern may not be a strict ellipse and may also be a shape approximate to an ellipse, such as a runway shape or a rounded rectangle. In this case, the shape of the contact pattern may not be accurately determined according to the first connection line and the second connection line.

Further, the touch sensors may sense contact signals with low strength at a position where a finger of the user may not touch the display panel but keep close to the display panel, due to the electric field induction. In addition, when the user touches the terminal, due to the electric field induction, touch sensors at the finger edge may also sense contact signals with low strength. However, these positions of contact signals with low strength do not belong to the contact region.

In this example, a reference value may be preset. A contact signal with a strength lower than the reference value is determined as a signal generated by the finger without physical contact with the display panel, and a contact signal with a strength greater than or equal to the reference value is determined as a signal generated by the finger with physical contact with the display panel. In this way, positions where the finger is not in physical contact with the display panel will be removed from the contact pattern. Further, the pressure of the finger on a contact surface gradually decreases outwardly from a center of the contact surface, and the strength of the contact signal sensed by the touch sensors also gradually decreases outwardly from the center. In this case, an edge of the contact pattern may be determined according to coordinates of touch sensors with the minimum strength among the touch sensors corresponding to the contact signals with strengths greater than or equal to the reference value.

Therefore, the contact signal strength may be further considered on the basis of determining the contact pattern according to the first connection line, the second connection line, the intersection point and the included angle, so that a shape of the contact pattern is accurately determined, thereby determining the contact pattern accurately.

Figure 10:
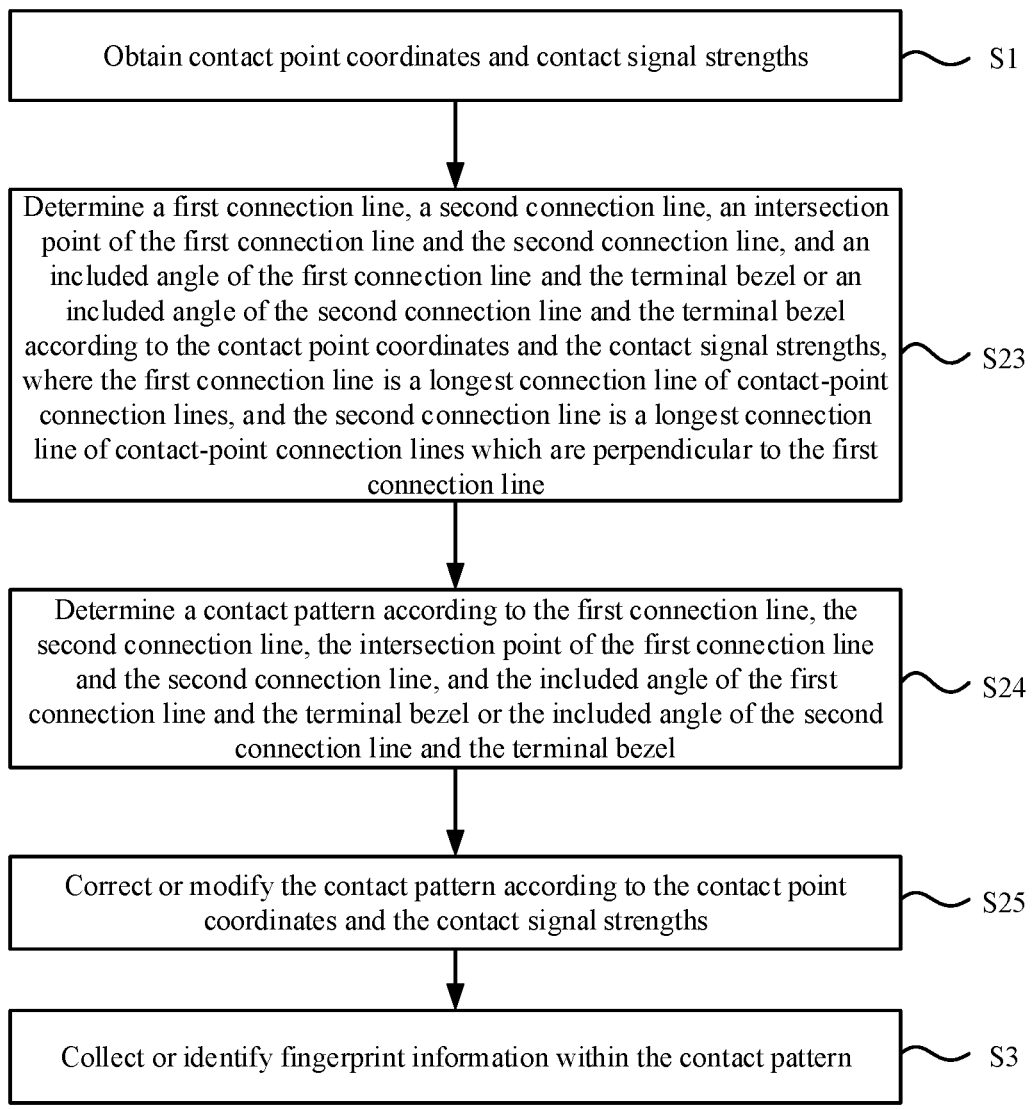
FIG. 10 is a flowchart illustrating another method of identifying a fingerprint according to an example of the present disclosure.

FIG. 10 is a flowchart illustrating another method of identifying a fingerprint according to an example of the present disclosure. As shown in FIG. 10, obtaining the contact region parameters includes the following step S13.

At step S13, the contact point coordinates and the contact signal strengths are obtained.

Determining the contact pattern according to the contact region parameters includes the following steps S23-S25.

At step S23, the first connection line, the second connection line, the intersection point of the first connection line and the second connection line and the included angle of the first connection line and the terminal bezel or the included angle of the second connection line and the terminal bezel are determined according to the contact point coordinates and the contact signal strengths, where the first connection line is the longest connection line of contact-point connection lines, and the second connection line is the longest connection line of contact-point connection lines which are perpendicular to the first connection line.

At step S24, the contact pattern is determined according to the first connection line, the second connection line, the intersection point of the first connection line and the second connection line and the included angle of the first connection line and the terminal bezel or the included angle of the second connection line and the terminal bezel.

At step S25, the contact pattern is modified or corrected according to the contact point coordinates and the contact signal strengths.

In the examples of FIGS. 6, 7 and 9, a touch processor may determine the first connection line, the second connection line, the intersection point of the first connection line and the second connection line, and the included angle of the first connection line and the terminal bezel or the included angle of the second connection line and the terminal bezel according to the contact point coordinates. In the examples of FIGS. 6, 7 and 9, the touch processor may determine the contact pattern according to the first connection line, the second connection line, the intersection point of the first connection line and the second connection line and the included angle of the first connection line and the terminal bezel or the included angle of the second connection line and the terminal bezel. And in the examples of FIGS. 6, 7 and 9, the touch processor may correct the contact pattern according to the contact point coordinates and the contact signal strengths.

In an example, as shown in FIG. 10, the steps of S13-S25 may also be completed by a processor outside the touching module in the terminal, such as a Central Processing Unit (CPU), which will not be described herein.

Figure 11:
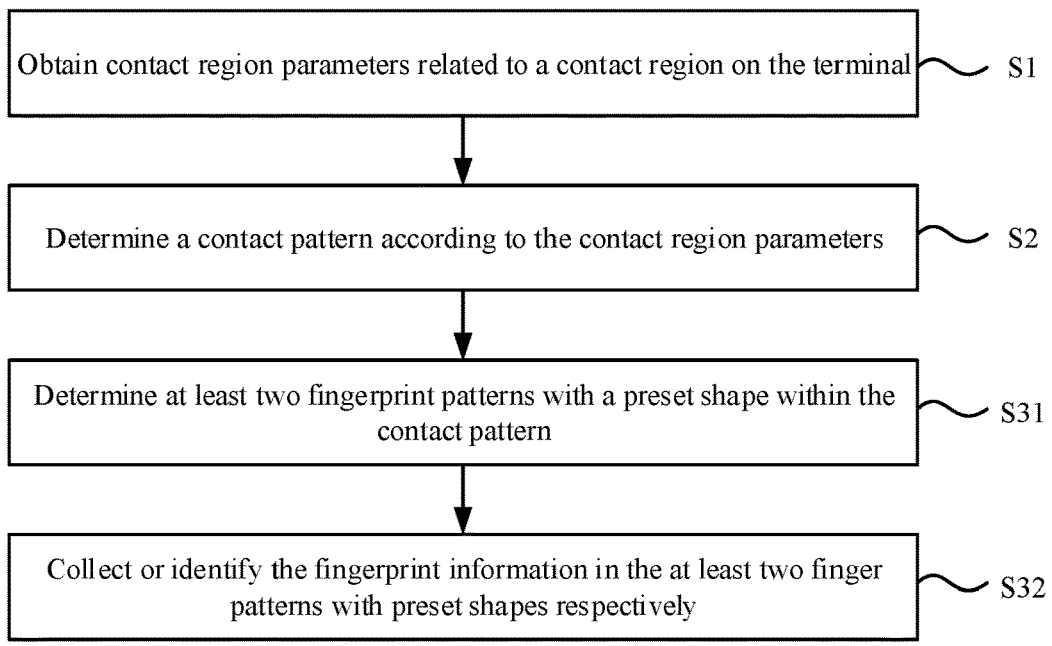
FIG. 11 is a flowchart illustrating another method of identifying a fingerprint according to an example of the present disclosure.

FIG. 11 is a flowchart illustrating another method of identifying a fingerprint according to an example of the present disclosure. As shown in FIG. 11, collecting and/or identifying the fingerprint information within the contact pattern includes the following steps S31-S32.

At step S31, at least two fingerprint patterns with a preset shape are determined within the contact pattern.

At step S32, the fingerprint information in the at least two fingerprint patterns with the preset shape is collected or identify respectively.

In an example, the collection or identification of the fingerprint information within the contact pattern may be a collection or identification performed for the at least two fingerprint patterns with the preset shape selected within the contact pattern.

Taking identification as an example, if the fingerprint information corresponding to the contact pattern is compared with pre-stored fingerprint information, it is required that fingerprint information collected by each fingerprint identification sensor is compared with the pre-stored fingerprint information and a data volume of compared data is positively correlated with a product of a data volume collected by the fingerprint identification sensors within the contact pattern and a data volume of the pre-stored fingerprint information collected by the fingerprint identification sensors earlier. Thus, when the fingerprint information corresponding to the contact pattern is directly compared with the pre-stored fingerprint information, the data volume of the compared data is excessively large, resulting in long comparison time and affecting user experience.

For example, the data volume collected by the fingerprint identification sensors within the contact pattern is 1000 and the data volume collected by the fingerprint identification sensors generating the pre-stored fingerprint information is 2000. In this case, the data volume of the compared data is positively correlated with 2000000, for example, 2000000 bits.

In this example, because the fingerprint pattern of the preset shape is located in the contact pattern, a data volume collected by the fingerprint identification sensors in the fingerprint pattern of the preset shape is smaller than the data volume collected by the fingerprint identification sensors in the entire contact pattern. When comparison with the pre-stored fingerprint information is performed, the data volume of the compared data when the fingerprint information corresponding to the fingerprint pattern of the preset shape is directly compared with the pre-stored fingerprint information is smaller than the data volume of the compared data when the fingerprint information corresponding to the contact pattern is directly compared with the pre-stored fingerprint information.

For example, the data volume collected by the fingerprint identification sensors within the fingerprint pattern is 200. If the data volume collected by the fingerprint identification sensors generating the pre-stored fingerprint information is still 2000, the data volume of the compared data is positively correlated with 400000, for example, 400000 bits. The data volume at this time is 1/5 of the data volume of the compared data when the fingerprint information corresponding to the contact pattern is directly compared with the pre-stored fingerprint information.

Even though the fingerprint information in a plurality of fingerprint patterns of a preset shape is compared with the pre-stored fingerprint information, if the number of the fingerprint patterns of the preset shape is not excessively large, in other words, if the total area of the fingerprint patterns of the preset shape is not larger than the area of the contact pattern, the data volume of the compared data when the fingerprint information in the plurality of fingerprint patterns of the preset shape is compared with the pre-stored fingerprint information is also smaller than the data volume of the compared data when the fingerprint information corresponding to the contact pattern is directly compared with the pre-stored fingerprint information. In this way, the consumption of terminal resources is reduced.

Figure 12:
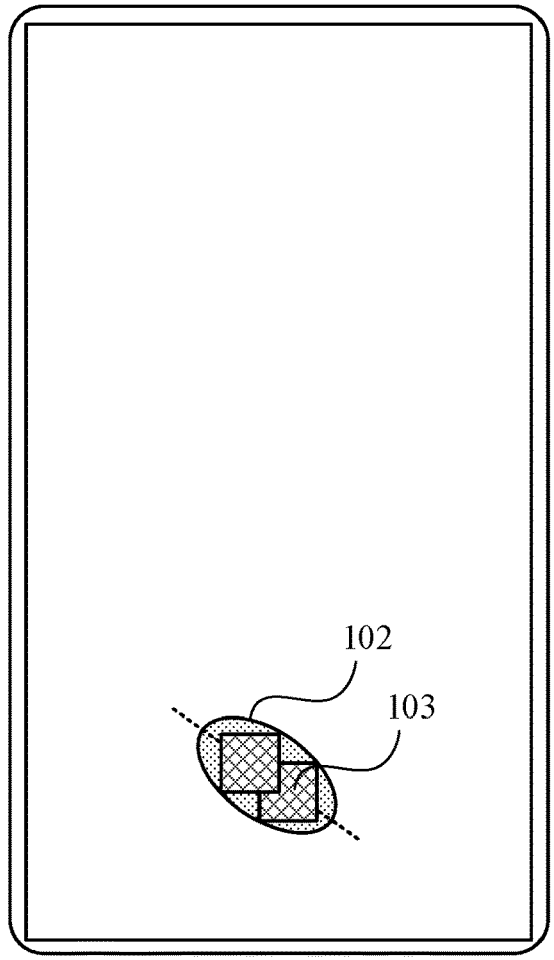
FIG. 12 is a schematic diagram illustrating a fingerprint pattern of a preset shape according to an example of the present disclosure.

FIG. 12 is a schematic diagram illustrating a fingerprint pattern of a preset shape according to an example of the present disclosure.

In an example, as shown in FIG. 12, the fingerprint pattern 103 of the preset shape may be a rectangle, and may also be set to another shape, such as a triangle and a circle, based on requirements. If it is to select or cut out a plurality of fingerprint patterns of the preset shape in the contact pattern, one fingerprint pattern of a preset shape may be selected along a particular direction at a preset distance. As shown in FIG. 12, selection may be performed along a major axis to ensure fingerprint information selected in the fingerprint pattern of the preset shape has no excessive repetitive information.

Optionally, preset shape of at least two fingerprint patterns with the preset shape include a same shape and/or different shapes.

In an example, to avoid excessive repetitive information in the fingerprint pattern selected each time, the selection may be performed at different positions of the contact pattern. However, the sizes of different positions within the contact pattern may be different. For example, in a contact pattern of an elliptical shape, a region around the center is larger in size in the direction of minor axis, and regions close to both ends of the major axis are smaller in size in the direction of minor axis. If selection is continued with the same preset shape along the direction of the major axis, a region outside the contact pattern may be selected, resulting in selection of useless data and wasting data processing resources.

As a result, preset shape of the at least two fingerprint patterns with the preset shape may be set to include a same shape and/or different shapes. For example, during a selection process, the fingerprint patterns of the same preset shape may be selected to reduce complexity of the selection operation. For another example, during a selection process, the fingerprint patterns with different preset shapes may be selected. For example, a square region with a large length is selected in a region around the center of the contact pattern, and a square region with a small length is selected in a region close to both ends of the major axis within the contact pattern. Thus, a region outside the contact pattern is prevented from being selected. Otherwise, useless data is selected and data processing resources are wasted.

In an example, a plurality of fingerprint patterns may be generated continuously so that one or more fingerprint patterns of preset shapes is obtained respectively in each contact pattern. Further, when the fingerprint information in the fingerprint patterns of the preset shape is compared with the pre-stored fingerprint information, more fingerprint information in the fingerprint patterns of the preset shape may be compared, which helps to improve accuracy of fingerprint identification and increase probability of successful fingerprint authentication.

For example, the pre-stored fingerprint information corresponds to loops and whorls around a finger pad of a user. In the related art, since the fingerprint identification region is greatly limited, the user may touch a fingertip to the fingerprint identification region. In this case, an identified fingerprint pattern is a fingerprint pattern of the fingertip, which is different from the fingerprint pattern of the finger pad. Thus, the fingerprint authentication will be unsuccessful. Since the user is a legitimate user, the authentication should be successful. As a result, a problem of inaccurate fingerprint identification occurs.

In an example of the present disclosure, the user usually moves his finger during a continuous contact with the terminal so that a plurality of fingerprint patterns are generated continuously. Therefore, the fingerprint information of the plurality of the fingerprint patterns is more comprehensive than the fingerprint information of one fingerprint pattern. The obtained fingerprint information may come from more fingerprint patterns of a preset shape, for example, the fingerprint information of a first fingerprint pattern of the preset shape corresponds to a fingerprint around the finger pad, and the fingerprint information of a second fingerprint pattern of the preset shape corresponds to a fingerprint around the fingertip. In this case, even though it is found through comparison that the fingerprint information of the first fingerprint pattern of the preset shape is different from the pre-stored fingerprint information, if the fingerprint information of the second fingerprint pattern of preset shape is same as the pre-stored fingerprint information, the fingerprint authentication will still be successful, thereby ensuring the accuracy of fingerprint identification.

Corresponding to the above examples of the method of identifying a fingerprint, the present disclosure further provides an example of an apparatus for identifying a fingerprint.

Figure 13:
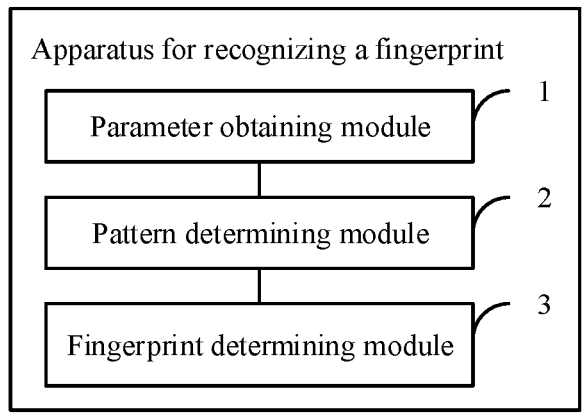
FIG. 13 is a block diagram illustrating an apparatus for identifying a fingerprint according to an example of the present disclosure.

FIG. 13 is a block diagram illustrating an apparatus for identifying a fingerprint according to an example of the present disclosure. The apparatus for identifying a fingerprint according to the present disclosure may be applied to a terminal such as a mobile phone, a tablet computer, and a wearable device. The terminal includes a touching module and a fingerprint identifying module. The touching module may include a plurality of touch sensors and a touch processor, and the fingerprint identifying module may include a plurality of fingerprint identification sensors and a fingerprint identification processor. The touch sensors include but not limited to mutual inductance capacitive sensors and/or self-inductance capacitive sensors, which may be selected according to needs. The fingerprint identification sensor includes but not limited to photoelectric sensors and/or ultrasonic sensors, which may be selected according to needs.

In an example, the terminal may further include a display panel having the touch sensors and the fingerprint identification sensors thereon.

It is noted that a fingerprint identification region where the fingerprint identification sensors are disposed in the examples of the present disclosure may be far larger than a fingerprint identification region in the related art. As shown in FIG. 1, the fingerprint identification region in the related art is a small region at a lower half portion of the display panel. In the examples of the present disclosure, the fingerprint identification region may be disposed in a half region of the display panel, even in the entire display panel.

As shown in FIG. 13, the apparatus for identifying a fingerprint may include:

a parameter obtaining module 1, configured to obtain contact region parameters;

a pattern determining module 2, configured to determine a contact pattern according to the contact region parameters; and a fingerprint determining module 3, configured to collect and/or identify fingerprint information within the contact pattern.

Optionally, the parameter obtaining module 1 is configured to: collect contact point coordinates, and determine a first connection line, a second connection line, an intersection point of the first connection line and the second connection line and an included angle of the first connection line and a terminal bezel or a included angle of the second connection line and the terminal bezel according to contact point coordinates, where the first connection line is a longest connection line of contact-point connection lines, and the second connection line is a longest connection line of contact-point connection lines which are perpendicular to the first connection line.

Optionally, the pattern determining module 2 is configured to: determine the contact pattern according to the first connection line, the second connection line, the intersection point of the first connection line and the second connection line and the included angle of the first connection line and the terminal bezel or the included angle of the second connection line and the terminal bezel.

Optionally, the parameter obtaining module 1 is further configured to: obtain contact signal strengths.

The pattern determining module 2 is further configured to: correct or modify the contact pattern according to the contact point coordinates and the contact signal strengths.

Figure 14:
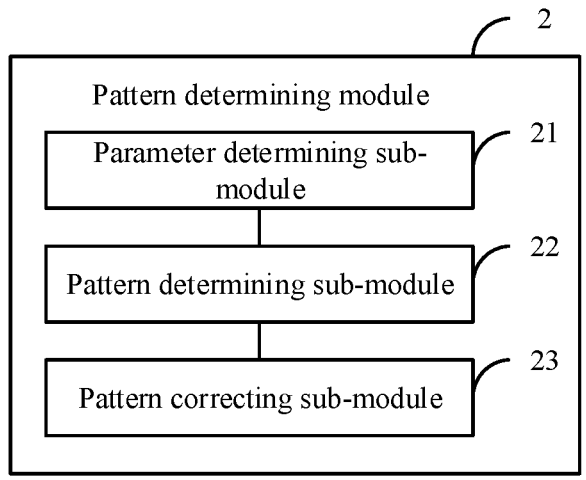
FIG. 14 is a block diagram illustrating a region determining module according to an example of the present disclosure.

FIG. 14 is a block diagram illustrating a pattern determining module 2 according to an example of the present disclosure. The parameter obtaining module 1 is configured to:

obtain the contact point coordinates and the contact signal strengths.

As shown in FIG. 14, the pattern determining module 2 includes:

a parameter determining sub-module 21, configured to determine the first connection line, the second connection line, the intersection point of the first connection line and the second connection line and the included angle of the first connection line and the terminal bezel or the included angle the second connection line and the terminal bezel according to the contact point coordinates and the contact signal strengths, where the first connection line is a longest connection line of contact-point connection lines, and the second connection line is a longest connection line of contact-point connection lines which are perpendicular to the first connection line;

a pattern determining sub-module 22, configured to determine the contact pattern according to the first connection line, the second connection line, the intersection point of the first connection line and the second connection line and the included angle of the first connection line and the terminal bezel or the included angle of the second connection line and the terminal bezel; and a pattern correcting sub-module 23, configured to correct or modify the contact pattern according to the contact point coordinates and the contact signal strengths.

Figure 15:
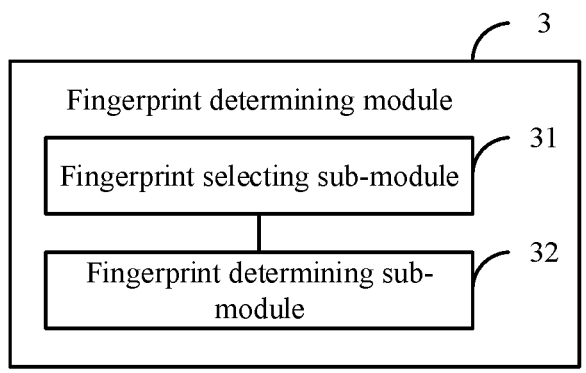
FIG. 15 is a block diagram illustrating a fingerprint determining module according to an example of the present disclosure.

FIG. 15 is a block diagram illustrating a fingerprint determining module 3 according to an example of the present disclosure. As shown in FIG. 15, the fingerprint determining module 3 includes:

a fingerprint selecting sub-module 31, configured to determine at least two fingerprint patterns with preset shape within the contact pattern; and a fingerprint determining sub-module 32, configured to collect and/or identify fingerprint information in the at least two fingerprint patterns with preset shape respectively.

Optionally, the preset shape of the at least two fingerprint patterns with preset shape includes a same shape and/or different shapes.

The specific manners of performing operations by different modules in the apparatus of the above examples are already detailed in the examples of the relevant methods and will not be repeated herein.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

An example of the present disclosure further provides an electronic device, including: one or more processors; and a memory storing processor-executable instructions, where, upon execution of the instructions, the one or more processors are configured to obtain contact region parameters; determine a contact pattern according to the contact region parameters; and collect and/or identify fingerprint information within the contact pattern.

The processor is configured to perform the method of any one example above.

An example of the present disclosure further provides a computer readable storage medium storing computer programs or instructions, where, when the instructions are executed by a processor, the instructions cause the processor to obtain contact region parameters; determine a contact pattern according to the contact region parameters; and collect and/or identify fingerprint information within the contact pattern. The programs or instructions are executed by the processor to perform steps of the method of any one example above.

Figure 16:
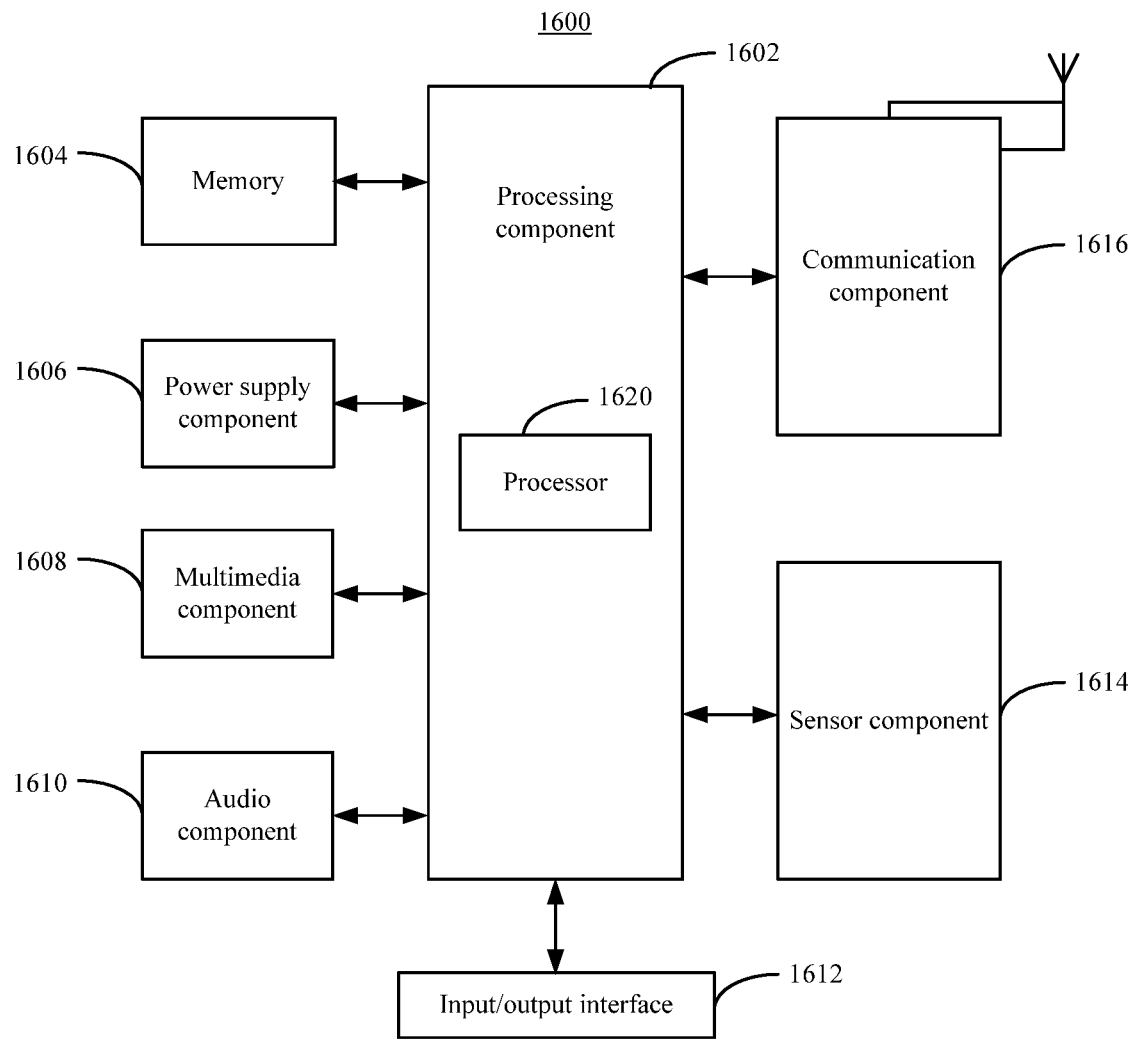
FIG. 16 is a block diagram illustrating an apparatus for identifying a fingerprint according to an example of the present disclosure.

FIG. 16 is a block diagram illustrating an apparatus 1600 for identifying a fingerprint according to an example of the present disclosure. For example, the apparatus 1600 may be a mobile phone, a computer, a digital broadcast terminal, a message transceiver, a game console, a tablet device, a medical device, a fitness device, a personal digital assistant, and the like.

As shown in FIG. 16, the apparatus 1600 may include one or more of the following components: a processing component 1602, a memory 1604, a power supply component 1606, a multimedia component 1608, an audio component 1610, an input/output (I/O) interface 1612, a sensor component 1614 and a communication component 1616.

The processing component 1602 usually controls overall operations of the apparatus 1600, such as operations relating to display, telephone calls, data communication, camera operations and recording operations. The processing component 1602 may include one or more processors 1620 for executing instructions to complete all or a part of the steps of the above method. In addition, the processing component 1602 may include one or more modules to facilitate interaction between the processing component 1602 and other components. For example, the processing component 1602 may include a multimedia module to facilitate the interaction between the multimedia component 1608 and the processing component 1602.

The memory 1604 is configured to store different types of data to support operations at the apparatus 1600. Examples of such data include instructions, contact data, phonebook data, messages, pictures, videos, and so on for any application or method that operates on the apparatus 1600. The memory 1604 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a CD.

The power supply component 1606 supplies power for different components of the apparatus 1600. The power supply component 1606 may include a power supply management system, one or more power supplies, and other components associated with generating, managing and distributing power for the apparatus 1600.

The multimedia component 1608 includes a screen providing an output interface between the apparatus 1600 and a user. In some examples, the screen may include a Liquid Crystal Display (LCD) and/or a Touch Panel (TP). If the screen includes a touch panel, the screen may be implemented as a touch screen for receiving an input signal from a user. The touch panel includes one or more touch sensors for sensing a touch, a slide and a gesture on the touch panel. The touch sensor may not only sense the boundary of a touching or sliding operations, but also detect duration and pressure related to the touching or sliding operations. In some examples, the multimedia component 1608 may include a front-facing camera and/or a rear camera. When the apparatus 1600 is in an operating mode, such as a shooting mode or a video mode, the front camera and/or the rear camera may receive external multimedia data. Each of the front-facing camera and the rear camera may be a fixed optical lens system or may be capable of focal length and optical zoom.

The audio component 1610 is configured to output and/or input an audio signal. For example, the audio component 1610 includes a microphone (MIC). When the apparatus 1600 is in an operating mode, such as a call mode, a record mode or a voice identification mode, the microphone is configured to receive an external audio signal. The received audio signal may be further stored in the memory 1604 or sent via the communication component 1616. In some examples, the audio component 1610 also includes a speaker for outputting an audio signal.

The I/O interface 1612 provides an interface between the processing component 1602 and a peripheral interface module. The peripheral interface module may be a keyboard, click wheel, a button and the like. These buttons may include but not limited to, a home button, a volume button, a start button and a lock button.

The sensor component 1614 includes one or more sensors for providing a state assessment in different aspects for the apparatus 1600. For example, the sensor component 1614 may detect the on/off state of the apparatus 1600, and a relative location of components. For example, the components are a display and a keypad of the apparatus 1600. The sensor component 1614 may also detect a position change of the apparatus 1600 or a component of the apparatus 1600, presence or absence of touch of a user on the apparatus 1600, an orientation or acceleration/deceleration of the apparatus 1600 and a temperature change of the apparatus 1600. The sensor component 1614 may include a proximity sensor for detecting the existence of a nearby object without any physical touch. The sensor component 1614 may further include an optical sensor, such as a CMOS or CCD image sensor used in an imaging application. In some examples, the sensor component 1614 may further include an acceleration sensor, a gyroscope sensor, a magnetic sensor, a pressure sensor, or a temperature sensor.

The communication component 1616 is configured to facilitate wired or wireless communication between the apparatus 1600 and other devices. The apparatus 1600 may access a wireless network based on a communication standard, such as WIFI, 2G or 3G, or a combination thereof. In an example, the communication component 1616 receives a broadcast signal or broadcast related information from an external broadcast management system via a broadcast channel. In an example, the communication component 1616 may further include a Near Field Communication (NFC) module for promoting short-range communications. For example, the NFC module may be implemented based on Radio Frequency Identification (RFID) technology, Infrared Data Association (IrDA) technology, Ultra Wide Band (UWB) technology, Bluetooth (BT) technology and other technology.

In an example, the apparatus 1600 may be implemented by one or more of an Application-Specific Integrated Circuit (ASIC), a Digital Signal Processor (DSP), a Digital Signal Processing Device (DSPD), a Programmable Logical Device (PLD), a Field Programmable Gate Array (FPGA), a controller, a microcontroller, a microprocessor or other electronic elements to perform the above method.

In an example, there is further provided a non-transitory computer readable storage medium including instructions, such as the memory 1604 including instructions. The above instructions may be executed by the processor 1620 of the apparatus 1600 to complete the above method. For example, the non-transitory computer readable storage medium may be a Read Only Memory (ROM), a Random Access Memory (RAM), a CD-ROM, a magnetic tape, a floppy disk, and optical data storage device and the like.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

After considering the specification and practicing the present disclosure, the persons of skill in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the art not disclosed in the present disclosure. The specification and examples herein are intended to be illustrative only.

It is to be understood that the present disclosure is not limited to the precise structures described above and shown in the accompanying drawings and may be modified or changed without departing from the scope of the present disclosure.

The invention claimed is:

1. A method of identifying a fingerprint, being applied to a terminal, and comprising:
   obtaining contact region parameters related to a contact region on the terminal;
   determining a contact pattern according to the contact region parameters; and
   collecting and/or identifying fingerprint information within the contact pattern;
   wherein collecting and/or identifying the fingerprint information within the contact pattern comprises:
      determining at least two fingerprint patterns with a preset shape within the contact pattern along a major axis of the contact pattern such that the fingerprint information in the at least two fingerprint patterns with the preset shape avoid excessive repetitive information; and
      collecting and/or identifying fingerprint information in the at least two fingerprint patterns with the preset shape respectively.

2. The method according to claim 1, wherein obtaining the contact region parameters comprises:
   collecting contact point coordinates; and determining a first connection line, a second connection line, an intersection point of the first connection line and the second connection line, and an included angle of the first connection line and a terminal bezel or an included angle of the second connection line and the terminal bezel according to the contact point coordinates, wherein the first connection line is a longest connection line of contact-point connection lines, and the second connection line is a longest connection line of contact-point connection lines which are perpendicular to the first connection line.

3. The method according to claim 2, wherein determining the contact pattern according to the contact region parameters comprises:

determining the contact pattern according to the first connection line, the second connection line, the intersection point of the first connection line and the second connection line, and the included angle of the first connection line and the terminal bezel or the included angle of the second connection line and the terminal bezel.

4. The method according to claim 3, wherein obtaining the contact region parameters further comprises:

obtaining contact signal strengths;

wherein determining the contact pattern according to the contact region parameters further comprises:

modifying the contact pattern according to the contact point coordinates and the contact signal strengths.

5. The method according to claim 1, wherein obtaining the contact region parameters comprises:

obtaining contact point coordinates and contact signal strengths;

wherein determining the contact pattern according to the contact region parameters comprises:

determining a first connection line, a second connection line, an intersection point of the first connection line and the second connection line, and an included angle of the first connection line and a terminal bezel or an included angle of the second connection line and the terminal bezel according to the contact point coordinates and the contact signal strengths, wherein the first connection line is a longest connection line of contact-point connection lines, and the second connection line is a longest connection line of contact-point connection lines which are perpendicular to the first connection line;

determining the contact pattern according to the first connection line, the second connection line, the intersection point of the first connection line and the second connection line, and the included angle of the first connection line and the terminal bezel or the included angle of the second connection line and the terminal bezel; and modifying the contact pattern according to the contact point coordinates and the contact signal strengths.

6. The method according to claim 1, wherein the preset shape of the at least two fingerprint patterns with the preset shape comprises a same shape or different shapes.

7. An electronic device, comprising:
one or more processors; and
a memory storing processor-executable instructions;
wherein, upon execution of the instructions, the one or more processors are configured to:
obtain contact region parameters related to a contact region on the terminal;
determine a contact pattern according to the contact region parameters; and
collect and/or identify fingerprint information within the contact pattern;
wherein collect and/or identify the fingerprint information within the contact pattern comprises:
determining at least two fingerprint patterns with a preset shape within the contact pattern along a major axis of the contact pattern such that the fingerprint information in the at least two fingerprint patterns with the preset shape avoid excessive repetitive information; and
collecting and/or identifying fingerprint information in the at least two fingerprint patterns with the preset shape respectively.

8. The electronic device according to claim 7, wherein the electronic device further comprises touch sensors, and the one or more processors are further configured to:

obtain contact point coordinates collected by the touch sensors.

9. The electronic device according to claim 8, wherein the one or more processors are further configured to:

determine a first connection line, a second connection line, an intersection point of the first connection line and the second connection line, and an included angle of the first connection line and a terminal bezel or an included angle of the second connection line and the terminal bezel according to the contact point coordinates, wherein the first connection line is a longest connection line of contact-point connection lines, and the second connection line is a longest connection line of contact-point connection lines which are perpendicular to the first connection line.

10. The electronic device according to claim 9, wherein the one or more processors are further configured to:

determine the contact pattern according to the first connection line, the second connection line, the intersection point of the first connection line and the second connection line, and the included angle of the first connection line and the terminal bezel or the included angle of the second connection line and the terminal bezel.

11. The electronic device according to claim 10, wherein the one or more processors are further configured to:

obtain contact signal strengths determined by the touch sensors; and modify the contact pattern according to the contact point coordinates and the contact signal strengths.

12. The electronic device according to claim 7, wherein the electronic device further comprises touch sensors, and the one or more processors are further configured to:

obtain contact point coordinates and contact signal strengths collected by the touch sensors;

determine a first connection line, a second connection line, an intersection point of the first connection line and the second connection line, and an included angle of the first connection line and a terminal bezel or an included angle of the second connection line and the terminal bezel according to the contact point coordinates and the contact signal strengths, wherein the first connection line is a longest connection line of contact-point connection lines, and the second connection line is a longest connection line of contact-point connection lines which are perpendicular to the first connection line;

determine the contact pattern according to the first connection line, the second connection line, the intersection point of the first connection line and the second connection line, and the included angle of the first connection line and the terminal bezel or the included angle of the second connection line and the terminal bezel; and modify the contact pattern according to the contact point coordinates and the contact signal strengths.

13. The electronic device according to claim 7, wherein the preset shape of the at least two fingerprint patterns with the preset shape comprises a same shape or different shapes.

14. A non-transitory computer readable storage medium storing instructions therein, wherein, when the instructions are executed by one or more processors, the instructions cause the one or more processors to:

obtain contact region parameters related to a contact region on the terminal;

determine a contact pattern according to the contact region parameters; and collect and/or identify fingerprint information within the contact pattern;

wherein collect and/or identify the fingerprint information within the contact pattern comprises:

determining at least two fingerprint patterns with a preset shape within the contact pattern along a major axis of the contact pattern such that the fingerprint information in the at least two fingerprint patterns with the preset shape avoid excessive repetitive information; and collecting and/or identifying fingerprint information in the at least two fingerprint patterns with the preset shape respectively.

15. The non-transitory computer readable storage medium according to claim 14, wherein the instructions further cause the one or more processors to:

obtain contact point coordinates collected by touch sensors; and determine a first connection line, a second connection line, an intersection point of the first connection line and the second connection line, and an included angle of the first connection line and a terminal bezel or an included angle of the second connection line and the terminal bezel according to the contact point coordinates, wherein the first connection line is a longest connection line of contact-point connection lines, and the second connection line is a longest connection line of contact-point connection lines which are perpendicular to the first connection line.

16. The non-transitory computer readable storage medium according to claim 15, wherein the instructions further cause the one or more processors to:

determine the contact pattern according to the first connection line, the second connection line, the intersection point of the first connection line and the second connection line, and the included angle of the first connection line and the terminal bezel or the included angle of the second connection line and the terminal bezel.

17. The non-transitory computer readable storage medium according to claim 16, wherein the instructions further cause the one or more processors to:

obtain contact signal strengths determined by the touch sensors; and modify the contact pattern according to the contact point coordinates and the contact signal strengths.

18. The non-transitory computer readable storage medium according to claim 14, wherein the instructions further cause the one or more processors to:

obtain contact point coordinates and contact signal strengths collected by touch sensors;

determine a first connection line, a second connection line, an intersection point of the first connection line and the second connection line, and an included angle of the first connection line and a terminal bezel or an included angle of the second connection line and the terminal bezel according to the contact point coordinates and the contact signal strengths, wherein the first connection line is a longest connection line of contact-point connection lines, and the second connection line is a longest connection line of contact-point connection lines which are perpendicular to the first connection line;

determine the contact pattern according to the first connection line, the second connection line, the intersection point of the first connection line and the second connection line, and the included angle of the first connection line and the terminal bezel or the included angle of the second connection line and the terminal bezel; and modify the contact pattern according to the contact point coordinates and the contact signal strengths.

19. The non-transitory computer readable storage medium according to claim 14, wherein the preset shape of the at least two fingerprint patterns with the preset shape comprises a same shape or different shapes.

* * * * *